United States Patent
Gole et al.

(10) Patent No.: US 11,698,836 B2
(45) Date of Patent: Jul. 11, 2023

(54) METHODS AND SYSTEMS FOR RAID PROTECTION IN ZONED SOLID-STATE DRIVES

(71) Applicant: NETAPP, INC., San Jose, CA (US)

(72) Inventors: Abhijeet Prakash Gole, Cupertino, CA (US); Sourav Sen, Cupertino, CA (US); Mark Smith, Cupertino, CA (US); Daniel Wang-Woei Ting, Palo Alto, CA (US)

(73) Assignee: NETAPP, INC., San Jose, CA (US)

(*) Notice: Subject to any disclaimer, the term of this patent is extended or adjusted under 35 U.S.C. 154(b) by 0 days.

(21) Appl. No.: 17/727,511

(22) Filed: Apr. 22, 2022

(65) Prior Publication Data

US 2022/0283900 A1   Sep. 8, 2022

Related U.S. Application Data

(63) Continuation of application No. 17/192,606, filed on Mar. 4, 2021, now Pat. No. 11,340,987.

(51) Int. Cl.
  *G06F 11/10* (2006.01)
  *G06F 3/06* (2006.01)
  *G06F 12/10* (2016.01)

(52) U.S. Cl.
  CPC ........ *G06F 11/1076* (2013.01); *G06F 3/0619* (2013.01); *G06F 3/0644* (2013.01);
  (Continued)

(58) Field of Classification Search
  CPC .. G06F 11/1076; G06F 3/0619; G06F 3/0644; G06F 3/0689; G06F 12/10; G06F 2212/657
  See application file for complete search history.

(56) References Cited

U.S. PATENT DOCUMENTS 5,664,187 A   9/1997 Burkes et al.
6,101,615 A   8/2000 Lyons
(Continued)

FOREIGN PATENT DOCUMENTS

EP   1343087 A2   9/2003

OTHER PUBLICATIONS

Dholakia A., et al., "A New Intra-disk Redundancy Scheme for High-Reliability RAID Storage Systems in the Presence of Unrecoverable Errors," ACM Transactions on Storage, May 2008, vol. 4 (1), Article 1, 42 pages.
(Continued)

*Primary Examiner* — Kyle Vallecillo
(74) *Attorney, Agent, or Firm* — Loza & Loza, LLP; Tejinder Singh

(57) ABSTRACT

Methods and systems for a storage environment are provided. One method includes splitting storage of a plurality of zoned solid-state drives (ZNS SSDs) into a plurality of physical zones (PZones) across a plurality of independent media units of each ZNS SSD, the PZones visible to a first tier RAID (redundant array of independent disks) layer; generating a plurality of RAID zones (RZones), each RZone having a plurality of PZones; presenting one or more RZones to a second tier RAID layer by the first tier RAID layer for processing read and write requests using the plurality of ZNS SSDs; and utilizing, by the first tier RAID layer, a parity PZone at each ZNS SSD for storing parity information corresponding to data written in one or more PZone corresponding to a RZone presented to the second tier RAID layer and storing the parity information in a single parity ZNS SSD.

20 Claims, 14 Drawing Sheets

(52) U.S. Cl.
CPC ............ *G06F 3/0689* (2013.01); *G06F 12/10* (2013.01); *G06F 2212/657* (2013.01)

(56) References Cited

U.S. PATENT DOCUMENTS

| | | | |
|---|---|---|---|
| 8,074,021 | B1 | 12/2011 | Miller et al. |
| 8,463,991 | B2 | 6/2013 | Colgrove et al. |
| 8,549,222 | B1 | 10/2013 | Kleiman et al. |
| 8,775,868 | B2 | 7/2014 | Colgrove et al. |
| 8,832,373 | B2 | 9/2014 | Colgrove et al. |
| 8,850,108 | B1 | 9/2014 | Hayes et al. |
| 8,862,820 | B2 | 10/2014 | Colgrove et al. |
| 9,003,144 | B1 | 4/2015 | Hayes et al. |
| 9,021,297 | B1 | 4/2015 | Hayes et al. |
| 9,134,917 | B2 | 9/2015 | Kimmel et al. |
| 9,201,600 | B1 | 12/2015 | Hayes et al. |
| 9,218,244 | B1 | 12/2015 | Hayes et al. |
| 9,229,808 | B2 | 1/2016 | Colgrove et al. |
| 9,244,769 | B2 | 1/2016 | Colgrove et al. |
| 9,367,243 | B1 | 6/2016 | Hayes et al. |
| 9,483,346 | B2 | 11/2016 | Davis et al. |
| 9,495,255 | B2 | 11/2016 | Davis et al. |
| 9,525,738 | B2 | 12/2016 | Hayes et al. |
| 9,563,506 | B2 | 2/2017 | Hayes et al. |
| 9,588,842 | B1 | 3/2017 | Sanvido et al. |
| 9,594,633 | B2 | 3/2017 | Colgrove et al. |
| 9,672,125 | B2 | 6/2017 | Botes et al. |
| 9,672,905 | B1 | 6/2017 | Gold et al. |
| 9,798,477 | B2 | 10/2017 | Botes et al. |
| 9,880,899 | B2 | 1/2018 | Davis et al. |
| 9,934,089 | B2 | 4/2018 | Hayes et al. |
| 9,967,342 | B2 | 5/2018 | Colgrove et al. |
| 10,095,701 | B1 | 10/2018 | Faibish et al. |
| 10,180,879 | B1 | 1/2019 | Colgrove et al. |
| 10,248,516 | B1 | 4/2019 | Sanvido et al. |
| 10,303,547 | B2 | 5/2019 | Hayes et al. |
| 10,353,777 | B2 | 7/2019 | Bernat et al. |
| 10,372,506 | B2 | 8/2019 | Baptist et al. |
| 10,379,763 | B2 | 8/2019 | Colgrove et al. |
| 10,387,247 | B2 | 8/2019 | Baptist et al. |
| 10,387,250 | B2 | 8/2019 | Resch et al. |
| 10,387,256 | B2 | 8/2019 | Dhuse et al. |
| 10,402,266 | B1 | 9/2019 | Kirkpatrick et al. |
| 10,417,092 | B2 | 9/2019 | Brennan et al. |
| 10,432,233 | B1 | 10/2019 | Colgrove et al. |
| 10,437,673 | B2 | 10/2019 | Baptist et al. |
| 10,437,678 | B2 | 10/2019 | Resch |
| 10,452,289 | B1 | 10/2019 | Colgrove et al. |
| 10,467,107 | B1 | 11/2019 | Abrol et al. |
| 10,489,256 | B2 | 11/2019 | Hayes et al. |
| 10,503,598 | B2 | 12/2019 | Trichardt et al. |
| 10,521,120 | B1 | 12/2019 | Miller et al. |
| 10,530,862 | B2 | 1/2020 | Isely et al. |
| 10,534,661 | B2 | 1/2020 | Resch |
| 10,572,176 | B2 | 2/2020 | Davis et al. |
| 10,579,450 | B2 | 3/2020 | Khadiwala et al. |
| 10,606,700 | B2 | 3/2020 | Alnafoosi et al. |
| 10,613,974 | B2 | 4/2020 | Dreier et al. |
| 10,656,871 | B2 | 5/2020 | Peake |
| 10,657,000 | B2 | 5/2020 | Resch |
| 10,671,480 | B2 | 6/2020 | Hayes et al. |
| RE48,222 | E | 9/2020 | Colgrove et al. |
| 10,776,204 | B2 | 9/2020 | Resch et al. |
| 10,810,083 | B1 | 10/2020 | Colgrove et al. |
| 10,817,375 | B2 | 10/2020 | Colgrove et al. |
| 10,838,834 | B1 | 11/2020 | Sanvido et al. |
| 10,860,424 | B1 | 12/2020 | Dhuse et al. |
| 10,891,192 | B1 | 1/2021 | Brennan et al. |
| RE48,448 | E | 2/2021 | Colgrove et al. |
| 11,269,778 | B1 | 3/2022 | Kanteti |
| 11,442,646 | B2 | 9/2022 | Agarwal |
| 2006/0129873 | A1 | 6/2006 | Hafner et al. |
| 2006/0242539 | A1 | 10/2006 | Kang et al. |
| 2010/0332401 | A1 | 12/2010 | Prahlad et al. |
| 2012/0084506 | A1 | 4/2012 | Colgrove et al. |
| 2012/0151118 | A1 | 6/2012 | Flynn et al. |
| 2014/0281227 | A1 | 9/2014 | Herron et al. |
| 2015/0169244 | A1 | 6/2015 | Asnaashari et al. |
| 2015/0199151 | A1* | 7/2015 | Klemm ................ G06F 3/0614 |
| | | | 711/114 |
| 2016/0313943 | A1 | 10/2016 | Hashimoto et al. |
| 2016/0342470 | A1 | 11/2016 | Cudak et al. |
| 2017/0124345 | A1 | 5/2017 | Christiansen et al. |
| 2017/0220264 | A1 | 8/2017 | Sokolov et al. |
| 2019/0004964 | A1 | 1/2019 | Kanno |
| 2019/0018788 | A1 | 1/2019 | Yoshida et al. |
| 2019/0278663 | A1 | 9/2019 | Mehta et al. |
| 2020/0089407 | A1 | 3/2020 | Baca et al. |
| 2020/0394112 | A1 | 12/2020 | Gupta et al. |
| 2020/0409589 | A1 | 12/2020 | Bennett et al. |
| 2020/0409601 | A1 | 12/2020 | Helmick et al. |
| 2021/0081273 | A1 | 3/2021 | Helmick et al. |
| 2021/0081330 | A1 | 3/2021 | Bennett et al. |
| 2021/0132827 | A1* | 5/2021 | Helmick ............... G06F 3/0629 |
| 2021/0303188 | A1 | 9/2021 | Bazarsky et al. |
| 2022/0027051 | A1 | 1/2022 | Kant et al. |
| 2022/0137844 | A1 | 5/2022 | Goss et al. |
| 2022/0197553 | A1 | 6/2022 | Benhanokh et al. |
| 2022/0229596 | A1 | 7/2022 | Jung |
| 2022/0244869 | A1 | 8/2022 | Kanteti |
| 2022/0291838 | A1 | 9/2022 | Gorobets et al. |
| 2023/0082636 | A1 | 3/2023 | Zhu et al. |

OTHER PUBLICATIONS

Miao, B., et al., "HPDA: a Hybrid Parity-Based Disk Array for Enhanced Performance and reliability," ACM Transactions on Storage (TOS), vol. 8, No. 1, Publication [online], Feb. 2012 [retrieved Apr. 4, 2016). Retrieved from the Internet: URL: http://or.nsfc.gov.en/bitstream/00001903-5/90177/1/1000003549834.pdf, pp. 4.1-4.20.

NetApp, Inc., "Data ONTAP® 7.3 Data Protection Online Backup and Recovery Guide," Feb. 22, 2011, Part No. 210-05212_A0, 432 pages.

NetApp, Inc., "Data ONTAP® 7.3 Active/Active Configuration Guide," Jun. 16, 2011, Part No. 210-05247_A0, 214 pages.

NetApp, Inc., "Data ONTAP® 7.3 Archive and Compliance Management Guide," Mar. 4, 2010, Part No. 210-04827_A0, 180 pages.

NetApp, Inc., "Data ONTAP® 7.3 Block Access Management Guide for iSCSI and FC," Mar. 4, 2010, Part No. 210-04752_B0, 202 pages.

NetApp, Inc., "Data ONTAP® 7.3 Data Protection Tape Backup and Recovery Guide," Jan. 15, 2010, Part No. 210-04762_A0, 142 pages.

NetApp, Inc., "Data ONTAP® 7.3 Documentation Roadmap," Jul. 9, 2008, Part No. 210-04229_A0, 8 pages.

NetApp, Inc., "Data ONTAP® 7.3 File Access and Protocols Management Guide," Sep. 10, 2009, Part No. 210-04505_B0, 382 pages.

NetApp, Inc., "Data ONTAP® 7.3 MultiStore Management Guide," Mar. 4, 2010, Part No. 210-04855_A0, 144 pages.

NetApp, Inc., "Data ONTAP® 7.3 Network Management Guide," Jan. 15, 2010, Part No. 210-04757_A0, 222 pages.

NetApp, Inc., "Data ONTAP® 7.3 Software Setup Guide," Nov. 4, 2010, Part No. 210-05045_A0, 116 pages.

NetApp, Inc., "Data ONTAP® 7.3 Storage Efficiency Management Guide," Mar. 4, 2010, Part No. 210-04856_A0, 76 pages.

NetApp, Inc., "Data ONTAP® 7.3 Storage Management Guide," May 3, 2012, Part No. 210-04766_B0, 356 pages.

NetApp, Inc., "Data ONTAP® 7.3 System Administration Guide," Nov. 11, 2010, Part No. 210-05043_A0, 350 pages.

NetApp, Inc., "Data ONTAP® 7.3 Upgrade Guide," Nov. 11, 2010, Part No. 210-05042_A0, 200 pages.

NetApp, Inc., "Data ONTAP® 7.3.7 Release Notes," May 31, 2012, Part No. 215-06916_A0, 182 pages.

NetApp, Inc., "Date ONTAP® 7.3 Core Commands Quick Reference," Jun. 2008, Part No. 215-03893_A0, 1 page.

NetApp, Inc., "Notices," 2010, Part No. 215-05705_A0, 46 pages.

(56) References Cited

OTHER PUBLICATIONS

NetApp, Inc., "V-Series Systems Hardware Maintenance Guide," Jul. 2006, Part No. 210-00975_A0, 202 pages.
NetApp, Inc., "V-Series Systems Implementation Guide for Hitachi® Storage," Dec. 2009, Part No. 210-04694_A0, 66 pages.
NetApp, Inc., "V-Series Systems Installation Requirements and Reference Guide," Oct. 2010, Part No. 210-05064_A0, 214 pages.
NetApp, Inc., "V-Series Systems MetroCiuster Guide," Jul. 2009, Part No. 210-04515_A0, 80 pages.
NVM Express Base Specification; Mar. 9, 2020; Revision 1.4a; NVM Express Workgroup; 405 pages.
European Search Report for Application No. EP22157793 dated Jul. 19, 2022, 16 pages.
International Preliminary Report on Patentability for Application No. PCT/US2021/028879, dated Oct. 25, 2022, 3 pages.
International Search Report and Written Opinion for International Application No. PCT/US2021/028879, dated Aug. 35, 2021, 8 pages.
Mao B., et al., "HPDA: A Hybrid Parity-Based Disk Array for Enhanced Performance and Reliability," Retrieved from Internet URL: https://www.researchgate.net/publication/224140602, May 2020; 13 pages.
Notice of Allowance on co-pending US application (U.S. Appl. No. 16/858,019) dated Dec. 20, 2022.
Non-Final Office Action on co-pending US application (U.S. Appl. No. 17/650,940) dated Feb. 16, 2023.
International Search Report and Written Opinion, International Patent Application No. PCT/US2022/049431, dated Mar. 3, 2023, 13 pgs.
Non-Final Office Action dated Mar. 30, 2023 for U.S. Appl. No. 17/494,684, filed Oct. 5, 2021, 8 pages.
Non-Final Office Action for Co-pending U.S. Appl. No. 17/456,012 dated Apr. 18, 2023.
Non-Final Office dated May 15, 2023 for U.S. Appl. No. 17/650,936, filed Feb. 14, 2022, 19 pages.

* cited by examiner

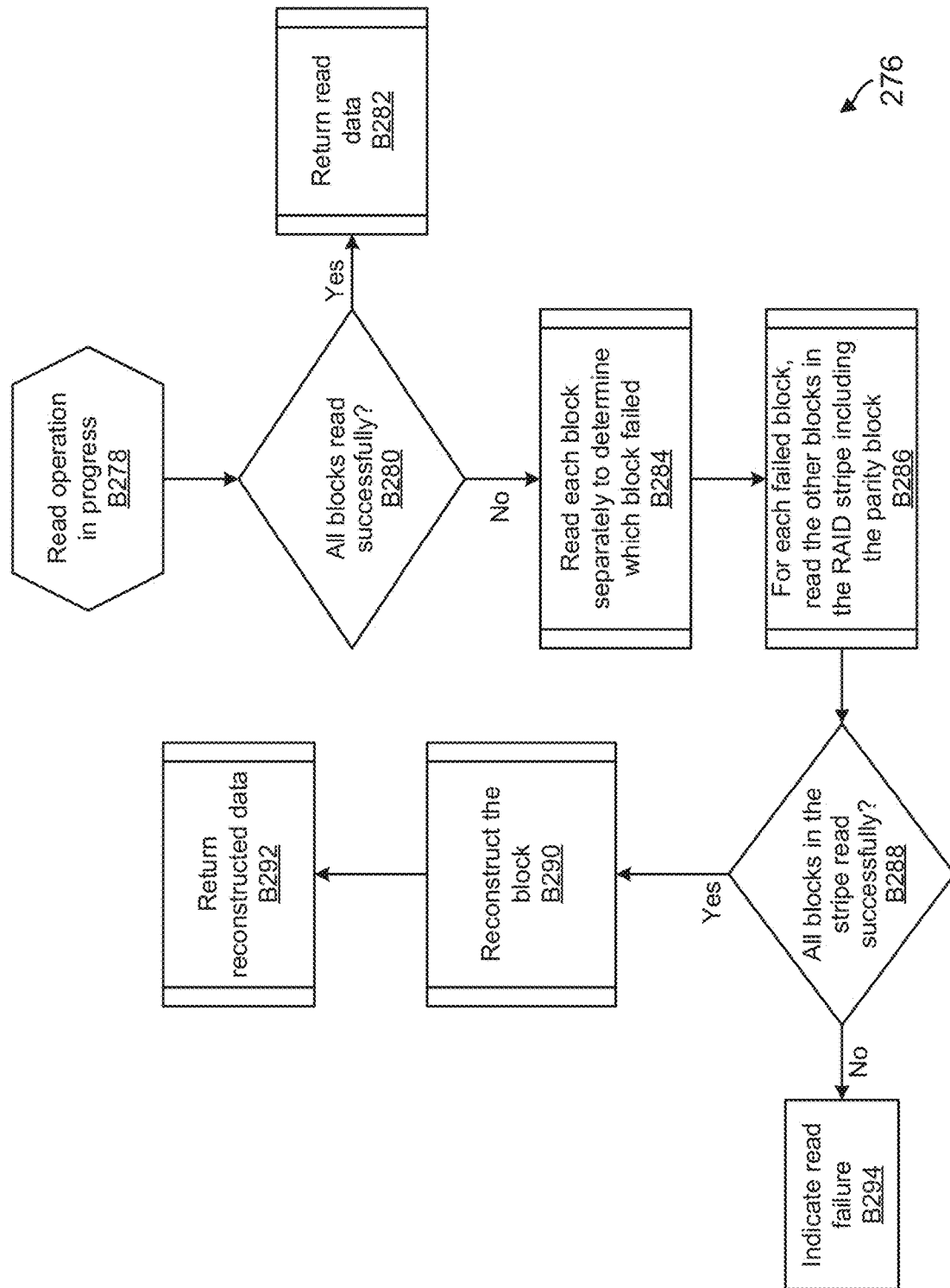

METHODS AND SYSTEMS FOR RAID PROTECTION IN ZONED SOLID-STATE DRIVES

CROSS-REFERENCE TO RELATED APPLICATION

This patent application claims priority of and is a continuation of co-pending U.S. patent application Ser. No. 17/192,606, filed on Mar. 4, 2021, the disclosure of which is incorporated herein by reference in its entirety.

TECHNICAL FIELD

The present disclosure relates to storage environments and more particularly, for providing RAID (redundant array of independent (or inexpensive) disks) protection in zoned solid-state drives.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices operating in a group of a storage sub-system. The storage devices (may also be referred to as "disks") within a storage system are typically organized as one or more groups (or arrays), wherein each group is operated as a PAID.

Most RAID implementations enhance reliability/integrity of data storage through redundant writing of data "stripes" across a given number of physical drives in the RAID group and storing parity data associated with striped data in dedicated parity drives. A storage device may fail in a storage sub-system. Data can be lost when one or more storage devices fail. The parity data is used to protect against loss of data in a RAID group.

RAID6 and RAID-DP (RAID-Dual Parity) type protection is typically employed to protect RAID groups against dual drive failures. Both RAID6 and RAID-DP employ two redundant storage drives to store dual parity data. Double failure protection by dual parity RAID includes ability to continue providing data after two drives have failed or a single drive has failed and one of the other drives in the RAID group encounters an uncorrectable read error.

Conventional dual parity RAID schemes allocate at least two dedicated storage drives for storing parity data. This additional cost of dual parity protection is undesirable, especially when the storage drives are high-capacity SSDs and the RAID group contains fewer drives. For example, using 2 out of 8 drives of a RAID group to store parity data significantly reduces the overall storage capacity and increases the cost of storing parity data. Continuous efforts are being made to develop technology for providing dual parity data protection (e.g., RAID 6 and RAID-DP type protection) without having to use more than one parity drive for a RAID group.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures:

FIG. 2F shows a process for data reconstruction, according to one aspect of the present disclosure;

DETAILED DESCRIPTION

Figure 1A:
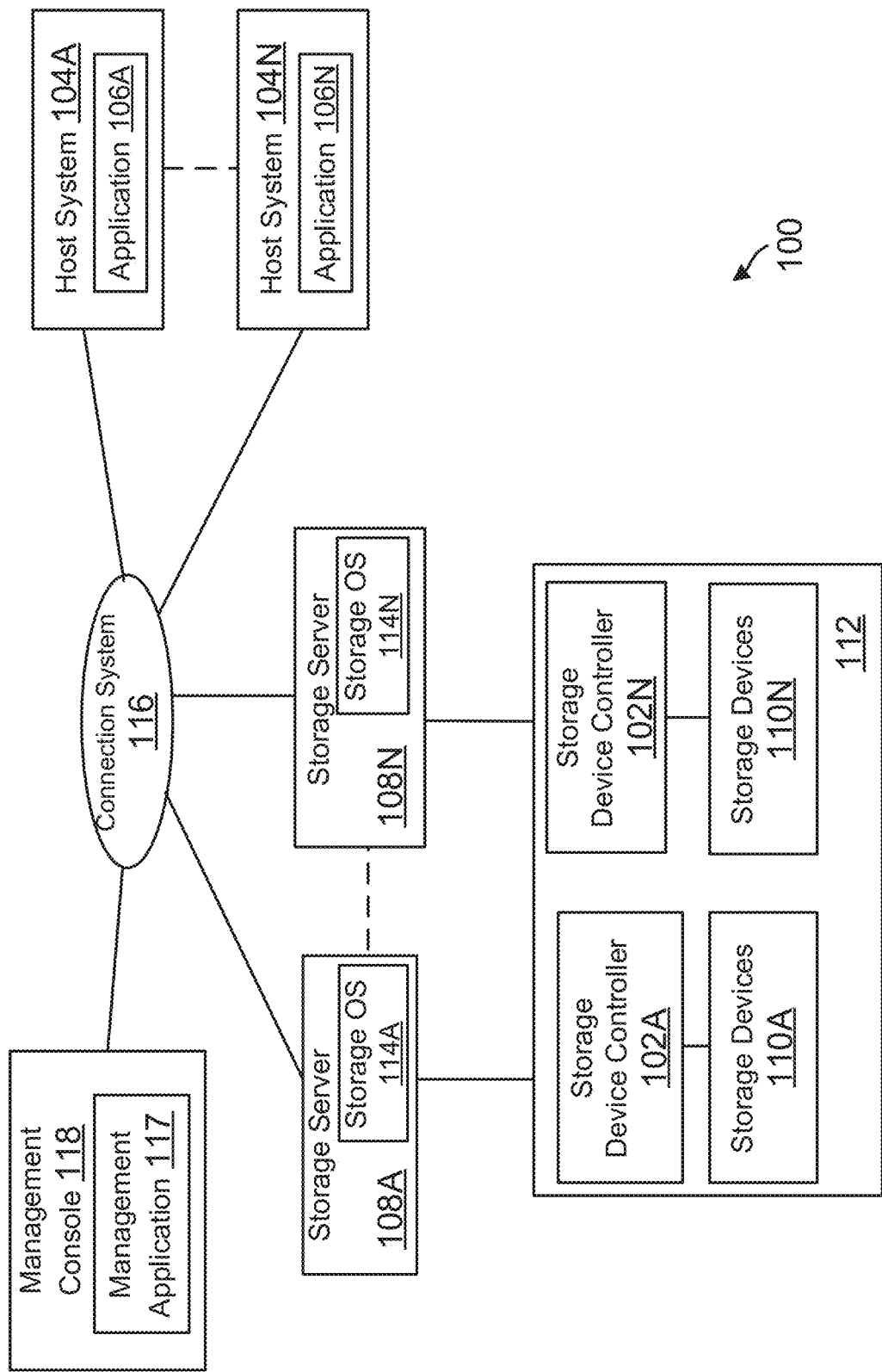
FIG. 1A shows an example of an operating environment for the various aspects disclosed herein.

In one aspect, innovative technology is provided to enable data protection against dual failures using parity information (also referred to as parity data) that is stored in one parity drive and in a plurality of data drives within a RAID (Redundant Array of Independent (or Inexpensive) Disks) group (or array, used interchangeably throughout this specification). Unlike conventional solutions provided by RAID-6 and RAID-DP, dual redundant parity drives are not used or needed for certain type of failure conditions. The disclosed technical solution saves cost because additional parity drives are not used, and the available storage capacity of a RAID group increases because two drives are not used to just store parity data.

In one aspect, the technology disclosed herein uses zoned namespace solid state drives ("ZNS SSDs"). A ZNS SSD has individual media units ("Mus") that operate independent of each other to store information. Storage space at each ZNS SSD is exposed as zones. The zones are configured using the independent MUs, which enables the MUs to operate as individual drives of a RAID group. A first tier RAID layer configures the storage space of ZNS SSDs into physical zones ("PZones") spread uniformly across the MUs. Each MU is configured to include a plurality of PZones. The first tier RAID layer configures a plurality of RAID zones ("RZones"), each having a plurality of PZones. The RZones are presented to other layers, e.g., a tier 2 RAID layer that interfaces with a file system to process read and write requests. The tier 2 RAID layer and the file system manager only see the RZone and the tier 1 layer manages data at the PZone level.

Parity is determined by XORing data stored across a horizontal stripe having a plurality of PZones. The parity data is stored at a single parity ZNS SSD and also within a parity PZone of each ZNS SSD. If a block or a MU fails, then the parity data stored at the individual ZNS SSD or the parity drive is used to reconstruct data. This provides RAID-6 and RAID-DP type parity protection without having to use two or more dedicated parity drives. Details regarding the innovative technology of the present disclosure are provided below.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

System 100: FIG. 1A shows an example of a networked operating environment 100 (also referred to as system 100) used according to one aspect of the present disclosure. As an example, system 100 may include a plurality of storage servers 108A-108N (may also be referred to as storage server/storage servers/storage controller/storage controllers 108) executing a storage operating system 114A-114N (may also be referred to as storage operating system 114 or storage operating systems 114), a plurality of computing systems 104A-104N (may also be referred to as server system/server systems 104 or as host system/host systems 104) that may access storage space provided by a storage-subsystem 112 managed by the storage servers 108 via a connection system 116 such as a local area network (LAN), wide area network (WAN), the Internet and others. The storage-subsystem 112 includes a plurality of storage devices 110A-110N (may also be referred to as storage device/storage devices/disk/disks 110) described below in detail. In one aspect, storage devices 110 are ZNS SSDs and are referred to as ZNS SSD or ZNS SSDs 110, as described below in detail. It is noteworthy that the term "disk" as used herein is intended to mean any storage device/space and not to limit the adaptive aspects to any particular type of storage device, for example, hard disks.

The server systems 104 may communicate with each other via connection system 116, for example, for working collectively to provide data-access service to user consoles (not shown). Server systems 104 may be computing devices configured to execute applications 106A-106N (may be referred to as application or applications 106) over a variety of operating systems, including the UNIX® and Microsoft Windows® operating systems (without derogation of any third-party rights). Application 106 may include an email exchange application, a database application or any other type of application. In another aspect, application 106 may comprise a virtual machine. Applications 106 may utilize storage devices 110 to store and access data.

Server systems 104 generally utilize file-based access protocols when accessing information (in the form of files and directories) over a network attached storage (NAS)-based network. Alternatively, server systems 104 may use block-based access protocols, for example but not limited to, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment, according to one aspect. In the virtual machine environment, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, the storage servers 108 use the storage operating system 114 to store and retrieve data from the storage sub-system 112 by accessing the ZNS SSDs 110 via storage device controllers 102A-102N (may also be referred to as disk controller/disk controllers 110). Data is stored and accessed using read and write requests that are also referred to as input/output (I/O) requests.

The storage devices 110 may include writable storage device media such as magnetic disks, video tape, optical, DVD, magnetic tape, non-volatile memory devices for example, self-encrypting drives, flash memory devices, ZNS SSDs and any other similar media adapted to store information. The storage devices 110 may be organized as one or more RAID groups. The various aspects disclosed herein are not limited to any particular storage device type or storage device configuration.

In one aspect, ZNS SSDs 110 comply with the NVMe (Non-Volatile Memory Host Controller Interface) zoned namespace (ZNS) specification defined by the NVM Express™ (NVMe™) standard organization. An SSD "zone" as defined by the NVMe ZNS standard is a sequence of blocks that can only be written in a sequential fashion and are overwritten by performing a "Zone Erase" or "Zone Reset operation" per the NVMe specification. A ZNS SSD storage space is exposed as zones. MUs of a ZNS SSD operate independent of each other to store information and are managed by the storage device controller 102. The zones are configured using the independent MUs, which enables the MUs to operate as individual drives of a RAID group. This enables the storage sub-system 112 to use a single parity ZNS SSD to store parity data and distribute the parity data within each ZNS SSD of a RAID group, as described below in detail.

In one aspect, to facilitate access to ZNS SSDs 110, the storage operating system 114 "virtualizes" the storage space provided by ZNS SSDs 110. The storage server 108 can present or export data stored at ZNS SSDs 110 to server systems 104 as a storage volume or one or more qtree sub-volume units. Each storage volume may be configured to store data files (or data containers or data objects), scripts, word processing documents, executable programs, and any other type of structured or unstructured data. From the perspective of the server systems, each volume can appear to be a single drive. However, each volume can represent the storage space in one storage device, an aggregate of some or all the storage space in multiple storage devices, a RAID group, or any other suitable set of storage space.

The storage server 108 may be used to access information to and from ZNS SSDs 110 based on a request generated by server system 104, a management console (or system) 118 or any other entity. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 transmits one or more input/output (I/O) commands, such as an NFS or CIFS request, over connection system 116 to the storage server 108. The storage operating system 114 generates operations to load (retrieve) the requested data from; ZNS 110 if it is not resident. "in-core," i.e., at the memory of the storage server. If the information is not in the memory, the storage operating system retrieves a logical volume block number (VBN) that is mapped to a disk identifier and disk block number (Disk,DBN). The DBN is accessed from a ZNS SSD by the disk controller 102 and loaded in memory for processing by the storage server 108. Storage server 108 then issues an NFS or CIFS response containing the requested data over the connection system 116 to the respective server system 104.

In one aspect, storage server 108 may have a distributed architecture, for example, a cluster-based system that may include a separate network module and storage module. Briefly, the network module is used to communicate with host platform server system 104 and management console 118, while the storage module is used to communicate with the storage subsystem 112.

The management console 118 executes a management application 117 that is used for managing and configuring various elements of system 100. Management console 118 may include one or more computing systems for managing and configuring the various elements.

Parity Protection: Before describing the details of the present disclosure, a brief overview of parity protection in a RAID configuration will be helpful. A parity value for data stored in storage subsystem 112 can be computed by summing (usually modulo 2) data of a particular word size (usually one bit) across a number of similar ZNS SSD holding different data and then storing the results in a parity ZNS SSD. That is, parity may be computed on vectors 1-bit wide, composed of bits in corresponding positions on each ZNS SSD. When computed on vectors 1-bit wide, the parity can be either the computed sum or its complement; these are referred to as even and odd parity, respectively. Addition and subtraction on 1-bit vectors are both equivalent to exclusive-OR (XOR) logical operations. The data is protected against the loss of any one of the ZNS SSDs, or of any portion of the data on any one of the SSDs. If the ZNS SSD storing the parity is lost, the parity can be regenerated from the data or from parity data stored within each ZNS SSD. If one of the ZNS SSD is lost, the data can be regenerated by adding the contents of the surviving ZNS SSDs together and then subtracting the result from the stored parity data.

Typically, storage devices in a RAID configuration are divided into parity groups, each of which comprises one or more data drive and a parity drive. A parity set is a set of blocks, including several data blocks and one parity block, where the parity block is the XOR of all the data blocks. A parity groups a set of drives from which one or more parity sets are selected. The storage space is divided into stripes, with each stripe containing one block from each drive. The blocks of a stripe are usually at the same locations on each drive in the parity group. Within a stripe, all but one block are blocks containing data ("data blocks") and one block is a block containing parity ("parity block") computed by the XOR of all the data. The innovative technology described herein uses a single ZNS SSD as a parity drive and stores parity data within each ZNS SSD, as described below in detail.

Figure 1B:
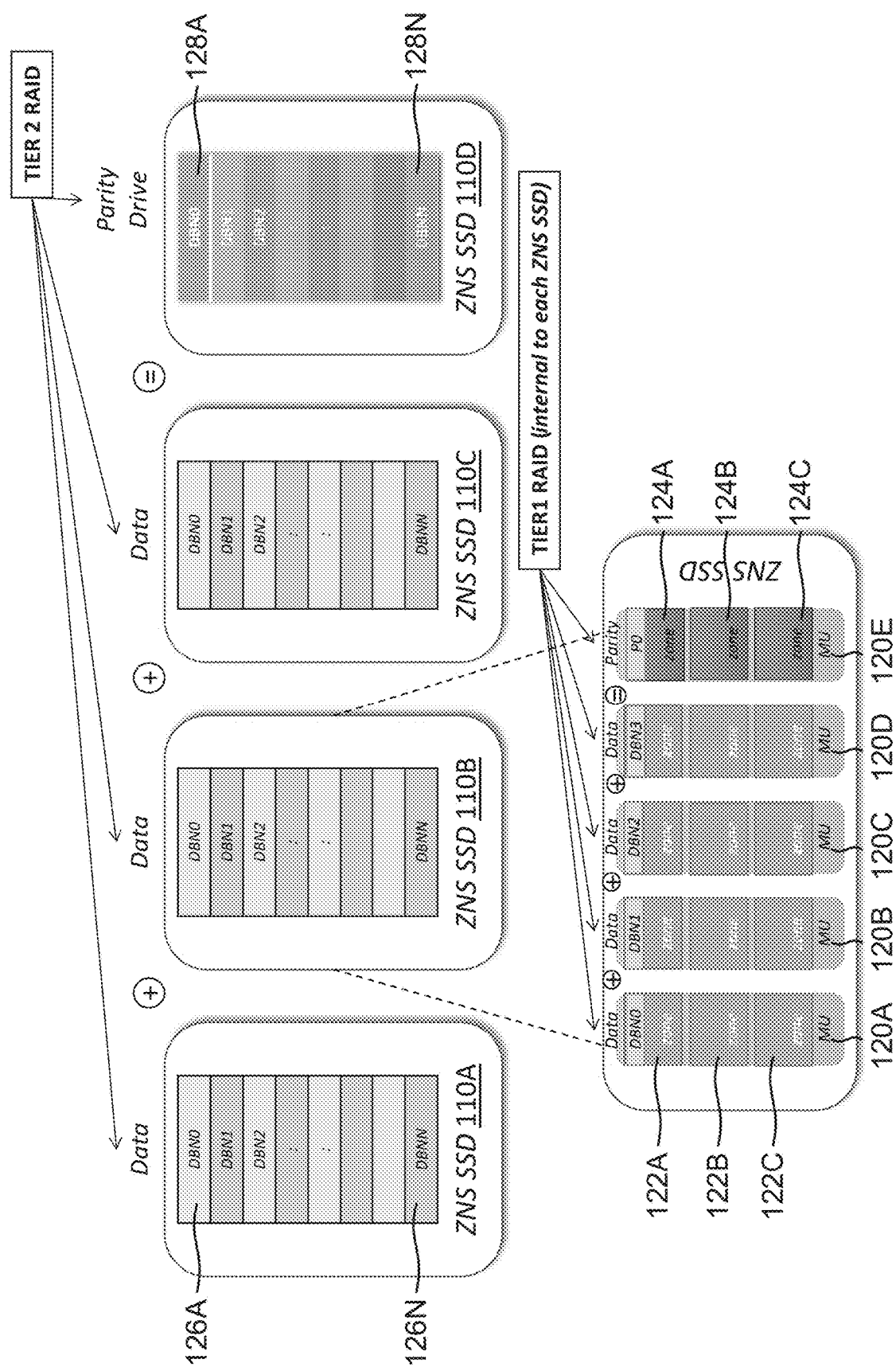
FIG. 1B shows illustrates configuration of ZNS (Zone Namespace) SSDs (solid state drives), according to one aspect of the present disclosure.

ZNS SSD RAID Configuration: FIG. 1B illustrates a Hierarchical RAID implementation providing dual parity protection (e.g., RAID6 and RAID-DP) using a single, ZNS SSD 110D as a parity drive to store parity data, and ZNS SSDs 110A-110C as data drives storing data. Unlike conventional systems that use two parity drives within a RAID group for providing RAID 6 and RAID-DP type protection, only one parity drive 110D is used.

Each ZNS SSD 110A-110D include a plurality of storage blocks identified by disk block numbers ("DBNs"), shown as DBN0-DBNN (e.g., 126A-126N for ZNS SSD 110A). The parity drive ZNS SSD 110D has similar DBNs shown as 128A-128N for storing parity data. The parity data is computed by XORing data stored at disk blocks in a horizontal stripe with the same DBN of each ZNS SSD data drive (i.e., 110A-110C). The computed parity is written to the same DBN on the parity drive 110D. For example, the parity for data stored at the first disk (DBN0) of each ZNS SSD 110A-110C is stored at the DBN0 128A of ZNS SSD 110D. This is referred to as TIER2 RAID for providing RAID protection if a ZNS SSD fails or if a block of a ZNS SSD fails.

Parity is also computed and stored at each ZNS SSD, which is referred to as TIER1 RAID. An example of TIER1 RAID is shown for ZNS SSD 110B that includes a plurality of MUs 120A-120E. A plurality of zones is configured for the MUs 120A-120E, e.g., zones 122A-122C are based on MU 120A, while parity zones 124A-124C are based on MU 120E to store parity data. The zones within each ZNS SSD are spread uniformly across the MUs. Parity data for TIER1 RAID is computed across zones and stored at the parity zones 124A-124C within MU 120E. By grouping zones from independent MUs into a RAID stripe, TIER1 RAID can provide data availability even if a block from one of the zones encounters an uncorrectable read error or an entire MU is inaccessible, as described below in detail.

Figure 1C:
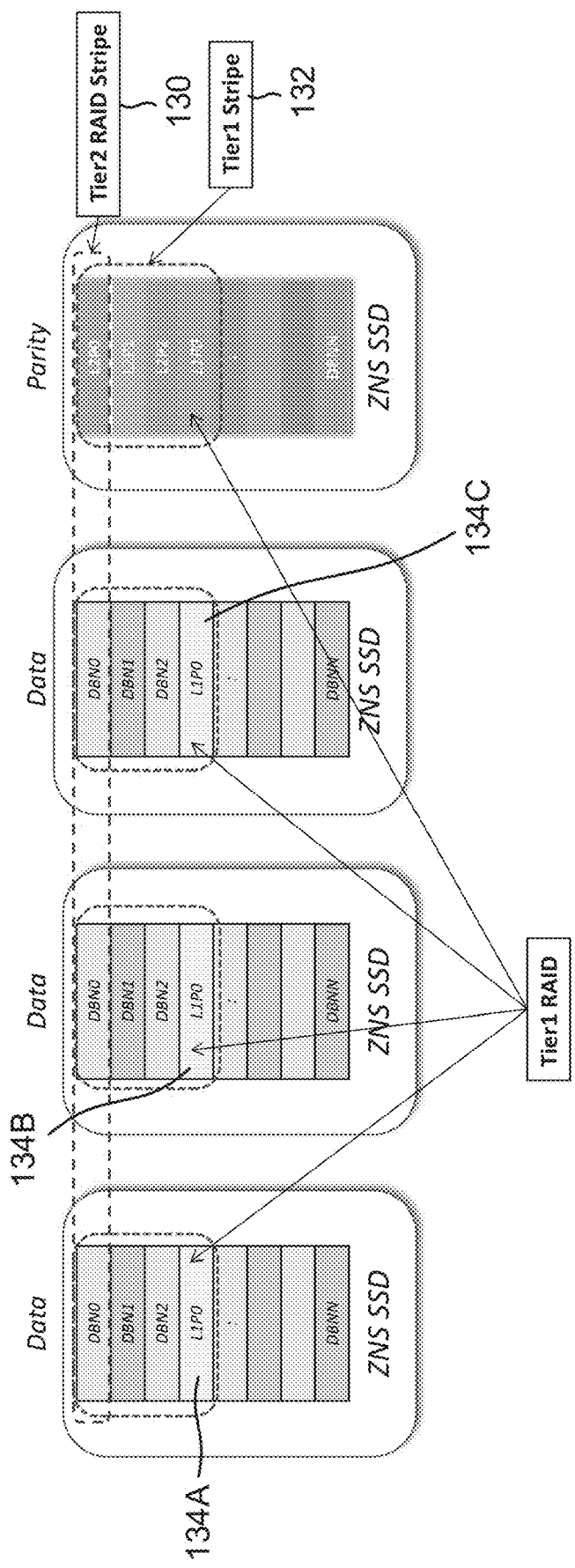
FIG. 1C provides another example of the ZNS SSD configuration, according to one aspect of the present disclosure.

FIG. 1C illustrates another representation of the innovative dual parity architecture having a single ZNS SSD 110D within a RAID group to store parity data and storing parity data at each ZNS SSD of the RAID group. A horizontal TIER2 RAID stripe is shown within the rectangle 130 and the vertical TIER1 RAID stripe is shown within 132. The vertical TIER1 RAID parity is also shown as L1P0 (134A-134C) in ZNS SSDs 110A-110C and written to disk blocks that are internal to each ZNS SSD, i.e., these hidden disk blocks are not visible to upper software layers (such as TIER2 RAID layer 136 and File System 134 shown in FIG. 1D, and described below in detail).

Figure 1D:
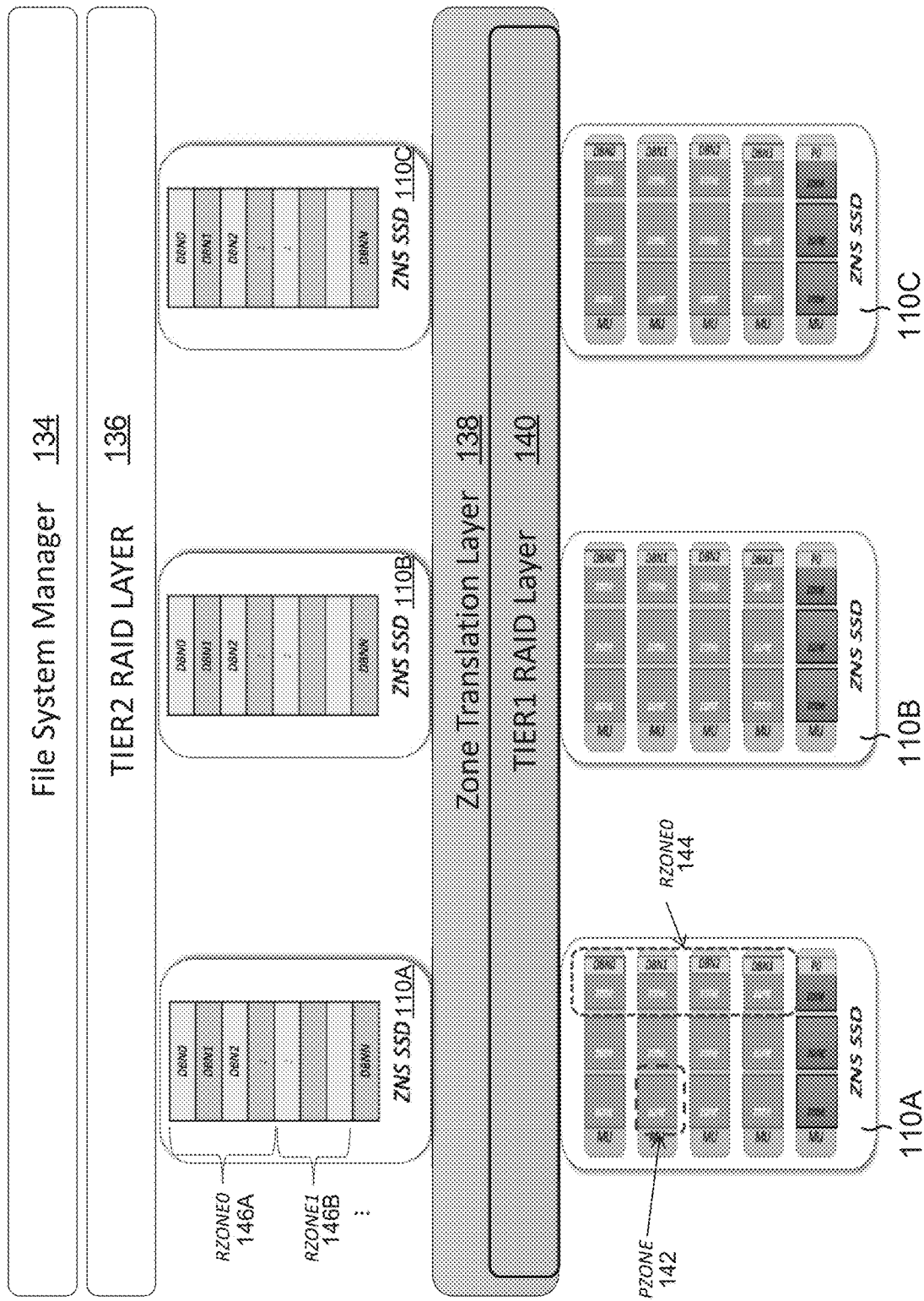
FIG. 1D shows an example architecture for using ZNS SSDs, according to one aspect of the present disclosure.

Software Architecture: FIG. 1D shows an example of the innovative software architecture used for implementing the innovative technology of the present disclosure. The architecture includes the file system manager 134 within the storage operating system 114, described in detail below with respect to FIG. 3. The TIER2 RAID layer 136 interfaces with the file system manager 134 for processing I/O requests to read and write data. A zone translation layer (ZTL) 138 with a TIER1 RAID layer 140 operate below the TIER2 RAID layer 136 for managing the zones within the ZNS SSDs 110A-110D. As an example, the total storage capacity of each ZNS SSD is split across physical zones (PZones), e.g., 142 for ZNS SSD 110A visible only to the TIER1 RAID layer 140. The PZones are grouped by MUs and each MU may contain a plurality of PZones. The TIER1 RAID layer 140 groups PZones across multiple MUs into a RAID-Zone ("RZone", e.g., RZone 0 144 for ZNS SSD 110A). After the TIER1 RAID layer 140 creates the RZones, the ZTL 138 and upper layers can view each ZNS SSD as a collection of RZones e.g., RZone 0 146A and RZone1 146B shown for ZNS SSD 110A.

In one aspect, ZNS SSDs 110A-110D have defined rules for writing to zones. For example, a zone should be "open: for writing and the writes are sequential with increasing block numbers of the zone. To enable multiple processors to write in parallel, the NVMe ZNS standard allows the ZNS SSDs to provide a Zone Random Write Area (ZRWA) for each available zone. The ZRWA is a buffer within a memory where writes to an open zone are gathered before being written to the PZones. ZRWA enables higher software layers (e.g., file system manager 134 and the TIER2 RAID layer 136) to issue sequential write commands without the overhead of guaranteeing that the writes arrive in the sequential order at the ZNS SSD. The data from the ZRWA is moved to the ZNS SSD zones via a "commit operation." An indication for the commit operation is provided by an upper layer software, e.g., the file system manager 134 and/or the TIER2 RAID layer 136. The commit operation may be explicit or implicit. An explicit commit operation happens when a commit command is sent to the ZNS SSD. An implicit operation commits data to a ZNS SSD zone, when the ZNS SSD receives a write command, which if executed would exceed the size of the ZRWA buffer (i.e., when the ZRWA buffer will reach a threshold value).

Figure 1E:
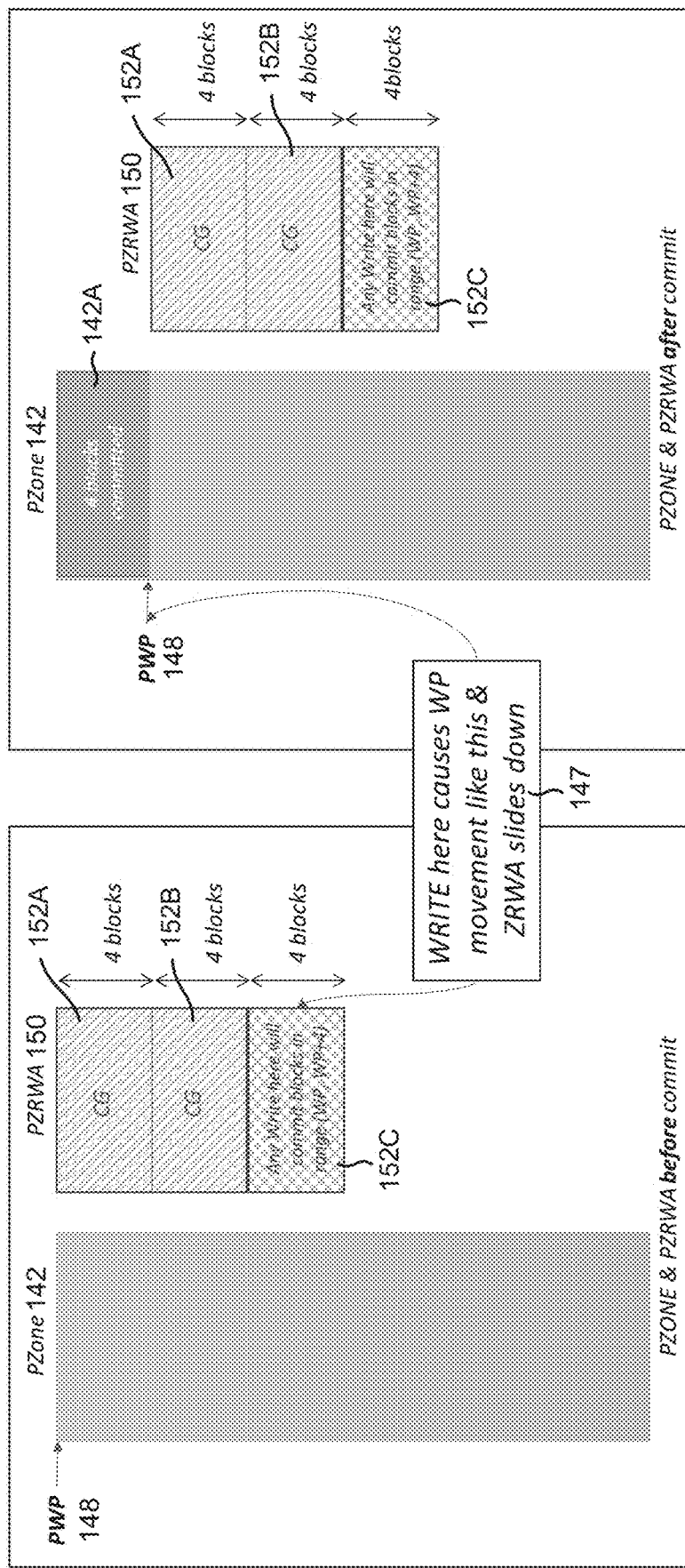
FIG. 1E shows an example of a "commit" operation for a physical zone (PZone) of a ZNS SSD.

Implicit Commit Operations: FIG. 1E shows an example of using the commit operation in a PZone (e.g., 142) of a ZNS SSD. Each PZone (e.g., 142) has a write pointer (WP) (shown as PWP 148). The location of PWP 148 shows a next writable block within the PZone 142. When a commit operation is executed, a certain number of data blocks (e.g., 152A/152B) from the beginning of the ZRWA (shown as PZRWA 150) are written at the WP 148 of the PZone and the WP 148 is incremented by the number of blocks written. The number of blocks thus written are termed as Commit Granularity (CG) of the PZone. CG is typically a property of the ZNS SSD, shown as an example, as 4 blocks. The size of the ZRWA 150 is a multiple of CG. An implicit commit operation occurs when a software layer sends a write command (shown as 147) to the ZNS SSD beyond the ZRWA, shown as 152C. FIG. 1E shows that the PWP 148 has moved 4 blocks, after the 4 blocks have been committed i.e., transferred to the PZone 142.

Figure 1F:
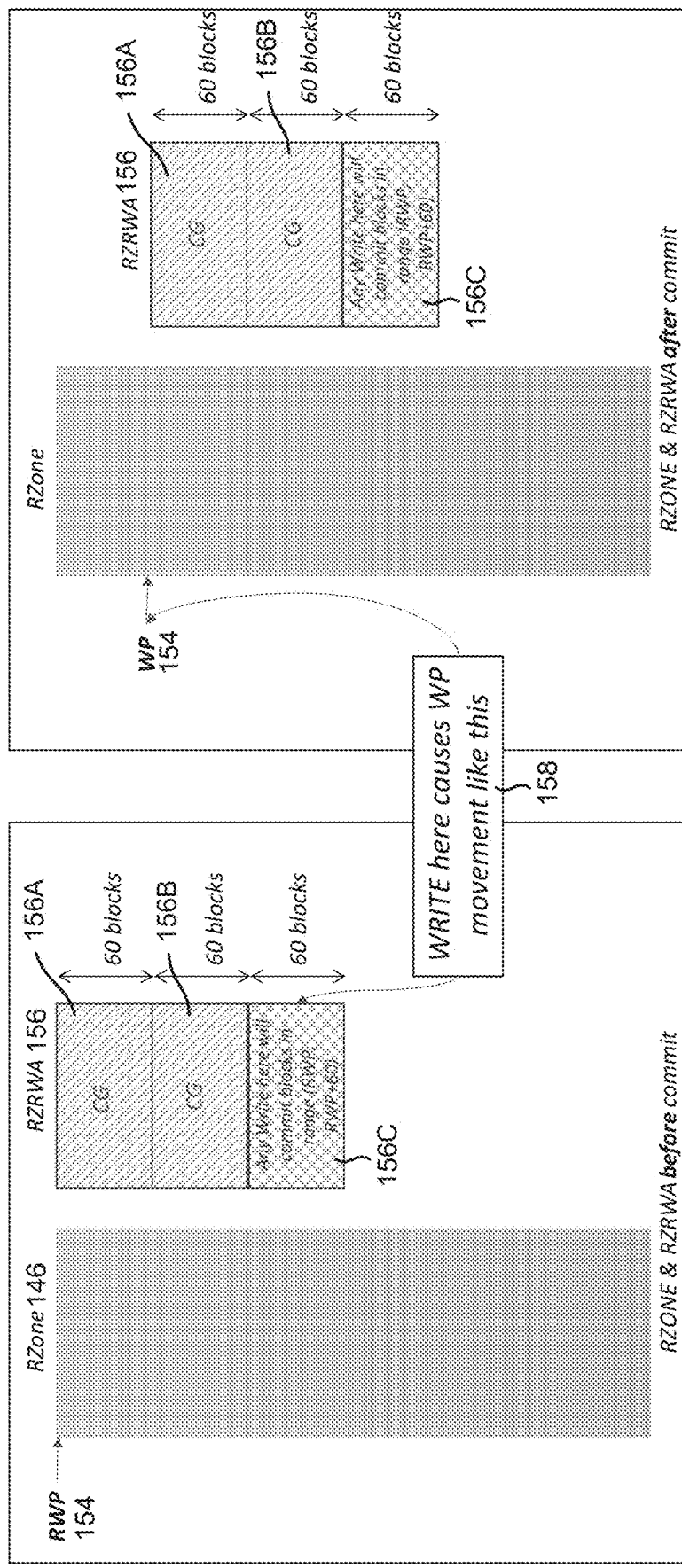
FIG. 1F shows an example of a "commit" operation for a RAID zone (RZone) of a ZNS SSD.

As mentioned above and shown in FIG. 1F, Tier1 RAID layer 140 constructs virtual RAID Zones (i.e., RZone) by grouping together PZones across multiple MUs, which effectively creates an RZone (e.g., 146) with an associated ZRWA (shown as RZRWA) 156 and a RZone Write Pointer (shown as RWP) 154. The example of FIG. 1F assumes a MU count of 15, which makes the RZRWA size=15×8=120 blocks and the RCG=15×4=60 blocks (e.g., 156A/156B). When a write operation (158) exceeds 120 blocks (shown as 156C), the data is committed from the virtual RZRWA 156 to the SSD. The RWP 154 then slides 60 blocks, as shown in FIG. 1F. In one aspect, PWP 148 tracks data from PZRZA 150 and RWP 154 track data movement between RZRWA 156 to RZone 146. This enables the TIER1 RAID layer to effectively manage data and parity writes, as described below in detail.

Figure 1G:
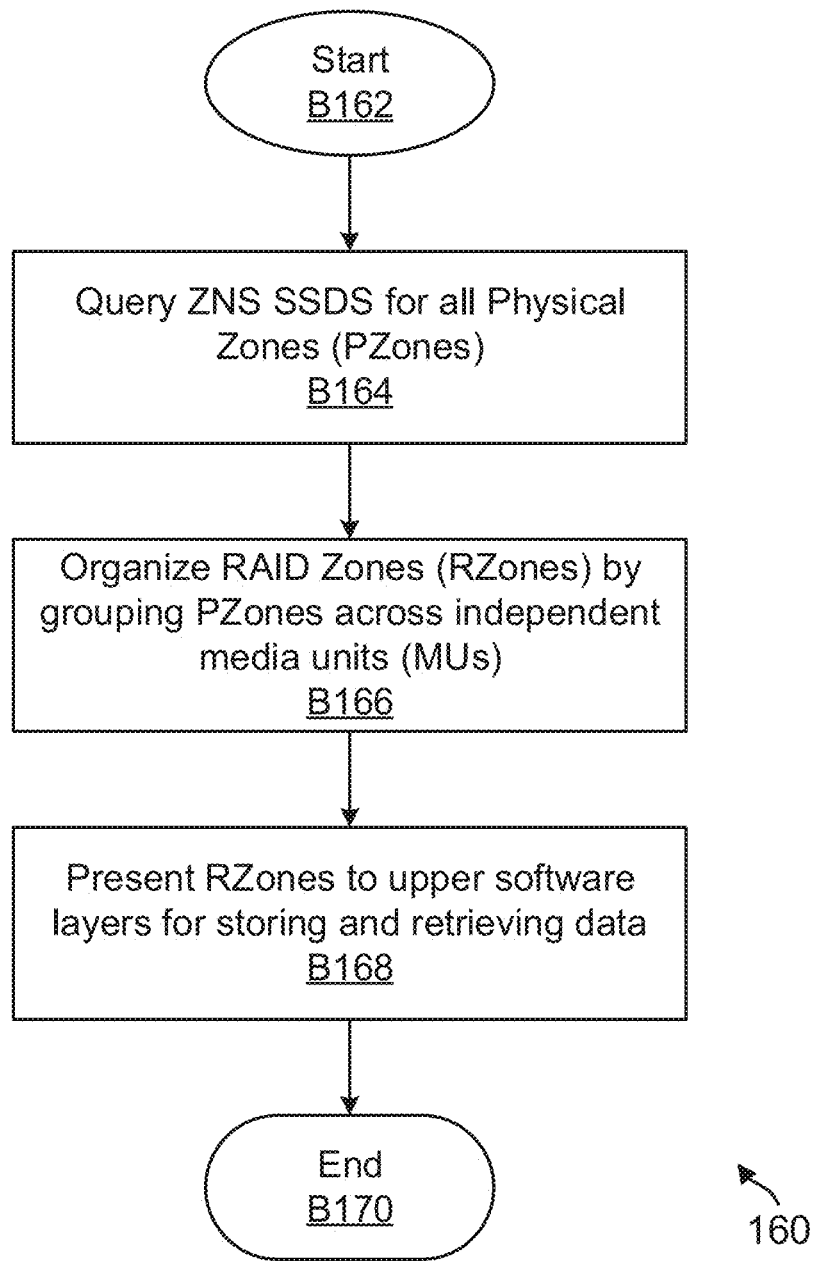
FIG. 1G shows a process for initializing PZones and RZones of a ZNS SSD, according to one aspect of the present disclosure.

PZone/RZone Initialization: FIG. 1G shows a process 160 for initializing the PZones and RZones by the TIER1 RAID layer 140, according to one aspect of the present disclosure. The process begins in block B162, before a ZNS SSD 110 is made available within the storage sub-system 112. In block B164, the TIER1 RAID layer 140 queries the ZNS SSDs for information regarding the PZones. Each ZNS SSD controller 102 executes firmware instructions out of a ZNS SSD memory. The controller 102 provides information regarding the PZones, which includes a PZone address, size, starting offset value or any other information that can identify the PZone.

In block B166, the TIER1 RAID layer 140 groups PZones across independent MUs (e.g., 120A-120E, FIG. 1B) to create RZones, e.g., 144 (FIG. 1D). Thereafter, in block B168, the RZones are presented to upper layers, e.g., the TIER2 RAID layer 136. The TIER2 RAID layer 136 can then present RZones (e.g., 146A, 146B, FIG. 1D) to other layers, e.g., the file system manager 134. The RZones and the PZones are then used for writing and retrieving data, as well as for storing parity data, as described below in detail. The process then ends in block B170.

Figure 2A:
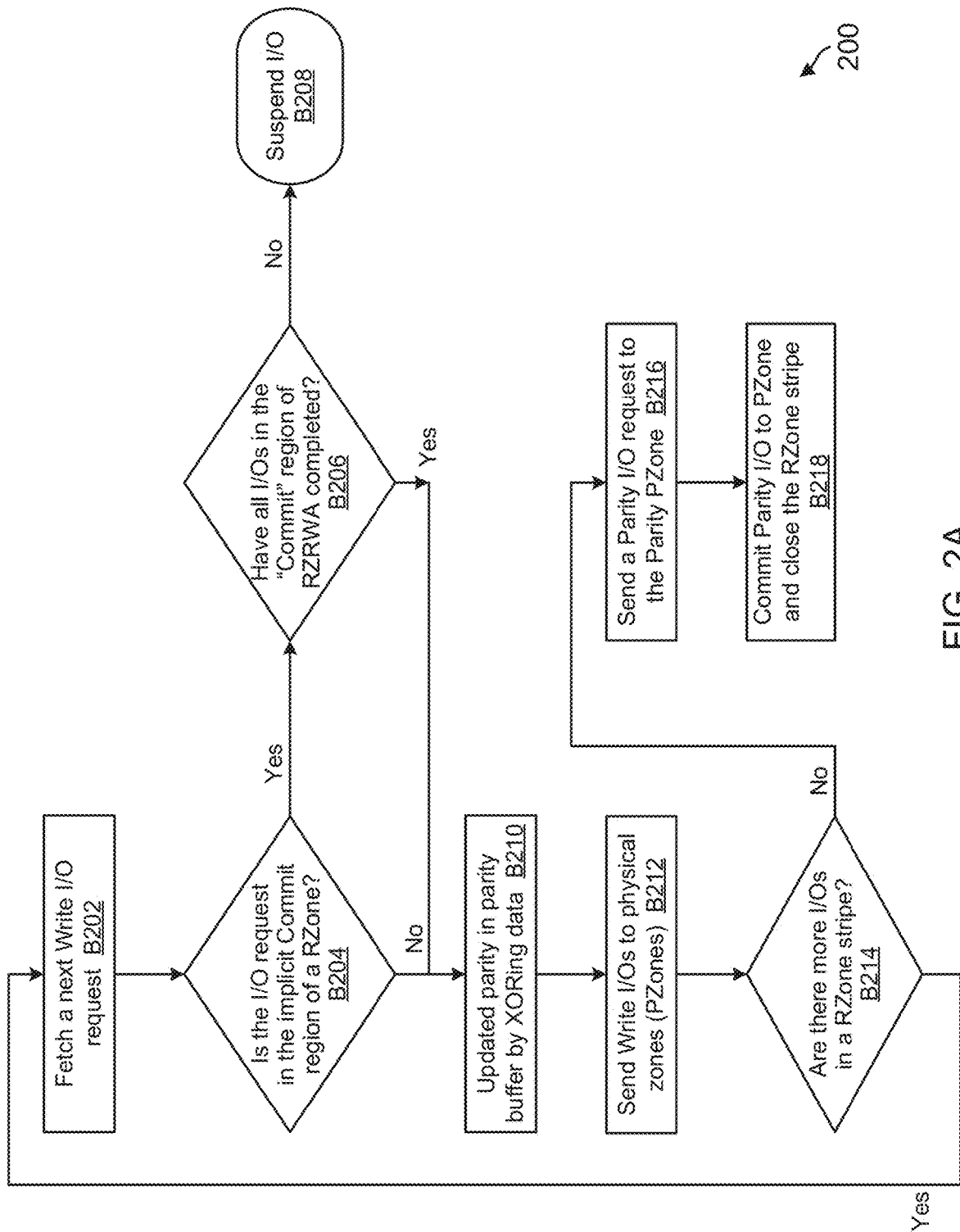
FIG. 2A shows a process for parity generation, according to one aspect of the present disclosure.
Figure 2B:
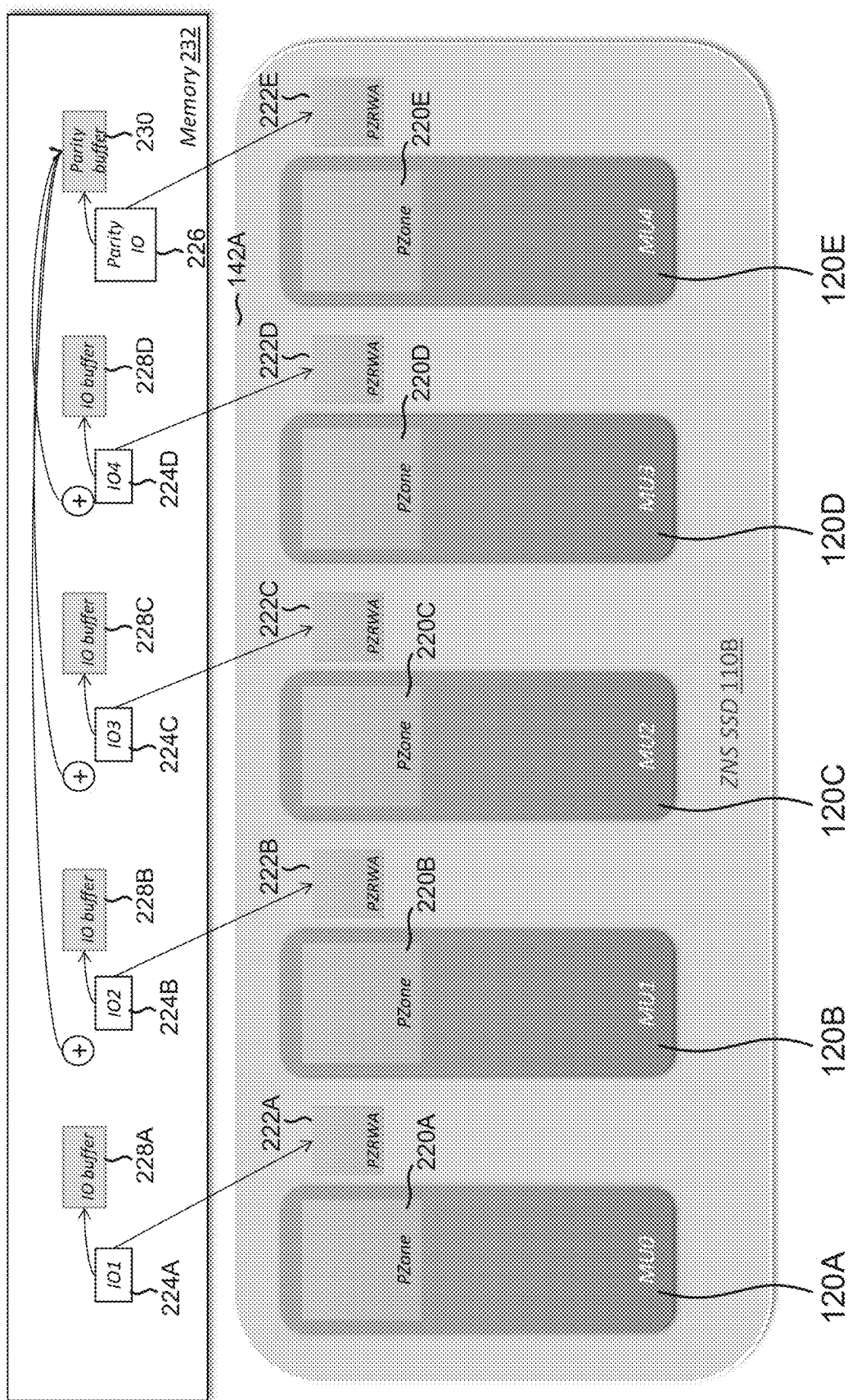
FIG. 2B illustrates a parity generation example, according to one aspect of the present disclosure.

Parity Generation in TIER1 RAID: FIGS. 2A and 2B illustrate parity generation by the TIER1 RAID layer 140, according to one aspect of the present disclosure. FIG. 2B shows an example of a process 200 of FIG. 2A using the ZNS SSD 110B with independent MUs 120A-120E (FIG. 1B). As mentioned above, the upper layers (e.g., the file system manager 134 and the TIER2 RAID layer 136) only see RZones (e.g., 146A/146B, FIG. 1D), hence all write I/Os that are received by the TIER1 RAID layer 140 target an RZone. The TIER1 RAID layer 140 issues child I/Os 224A-224D to PZones based on a range of blocks that are targeted by the RZone I/O sent by an upper software layer (134 or 136). The I/Os 224A-224D are issued to write data that is temporarily stored at a plurality of I/O buffers 228A-228D in storage server memory 232. For example, data associated with I/O 224A is first written to PZRWA 222A assigned to the PZone 220A, before being committed to the PZone 220A; data for I/O 224B is written to PZRWA 222B assigned to the PZone 220B, before being committed to the PZone 220B; data for I/O 224C is written to the PZRWA 222C assigned to the PZone 220C, before being committed to the PZone 220C; and data for I/O 224D is written to the PZRWA 222D assigned to the PZone 220D, before being committed to the PZone 220D.

The TIER1 RAID layer 140 also computes parity blocks for the parity PZone 220E corresponding to the targeted RZone. The TIER1 RAID layer 140 issues a parity I/O 226 for computed parity stored at a parity buffer 230. The parity buffer 230 may be designated within the storage server memory 232 to store parity data. Parity data for I/O 226E is written to PZRWA 222E assigned to the PZone 220E, before being written to the PZone 220E. The parity data is computed by XORing the data in the I/O buffers 228A-228D. It is noteworthy that the parity buffer 230 is written to the parity PZone 220E and committed after all the blocks in a corresponding RZone stripe have been committed to the appropriate PZones (e.g., 220A-220D). The TIER1 RAID layer 140 assumes that if any RZone I/O targets a block beyond the RZRWAs (156, FIG. 1F)+RWP (154, FIG. 1F) then all the I/Os in the data PZones 220A-220D have been committed. Based on that assumption, the TIER1 RAID layer 140 can write and explicitly commit the parity in the parity buffer 230 to the parity PZone 226.

Referring now to FIG. 2A, process 200 begins after a write I/O request is issued by the TIER2 layer 136 (or file system manager 134). The write I/O provides one or more RZone identifier. The TIER1 layer 140 fetches the I/O request in block B202. In block B204, the TIER1 layer 140 evaluates the I/O request, determines the size of the data that needs to be written and ascertains the number of blocks that will be required for the I/O request. Based on that determination, the TIER1 RAID layer 140 determines if the I/O request falls within an implicit commit region of the RZone (156C, FIG. 1F). If yes, then in block B206, the TIER1 RAID layer 140 determines if all pending write I/Os for the commit region of the RZRWA 156 have been committed to the appropriate PZones. If not, the I/O is delayed in block B208, until the commit operation is completed.

If the fetched I/O request does not belong to the commit region or if the previous I/O requests for the commit region have been committed, the process moves to block B210, when the parity in parity buffer 230 is updated by XORing the data in the I/O buffers 228A-228D. The TIER1 RAID layer 140 generates child write I/O requests, e.g., 224A-224D, that are sent to the PZRWAs 222A-222D and committed to PZones 220A-220D. If there are more I/O requests for the RZone stripe, as determined in block B214, the process reverts back to block B202, otherwise, the TIER1 RAID layer 140 generates a parity I/O 226 that is sent to the PZRWA 222E and committed in block B218. This completes the write I/O request and parity generation by the TIER1 RAID layer 140.

Parity Overwrite: The parity drive may see overwrites to parity blocks when an application sends a write request to write to a partial stripe, data is written to the partial stripe, parity is updated in a RZone of the parity drive 110D, and later, the application sends a new write request to complete the RAID stripe. In this example, the stripe parity is updated by computing the XOR of the new data blocks with the previous parity. This is enabled by using the RZRWA on the RZone of the parity drive 110D because a block in RZRWA is over-writable and an "in-flight parity buffer" can be updated with new data by XOR-ing out the old data in the block and XOR-ing in the new data by which the block is being overwritten. The TIER2 RAID layer 136 guarantees that no parity drive write will happen that would result in writing behind the write-pointer 154 for the RZone by providing an indication to the ZTL 138 so that the write pointer 154 can be advanced, described below in detail.

Figure 2C:
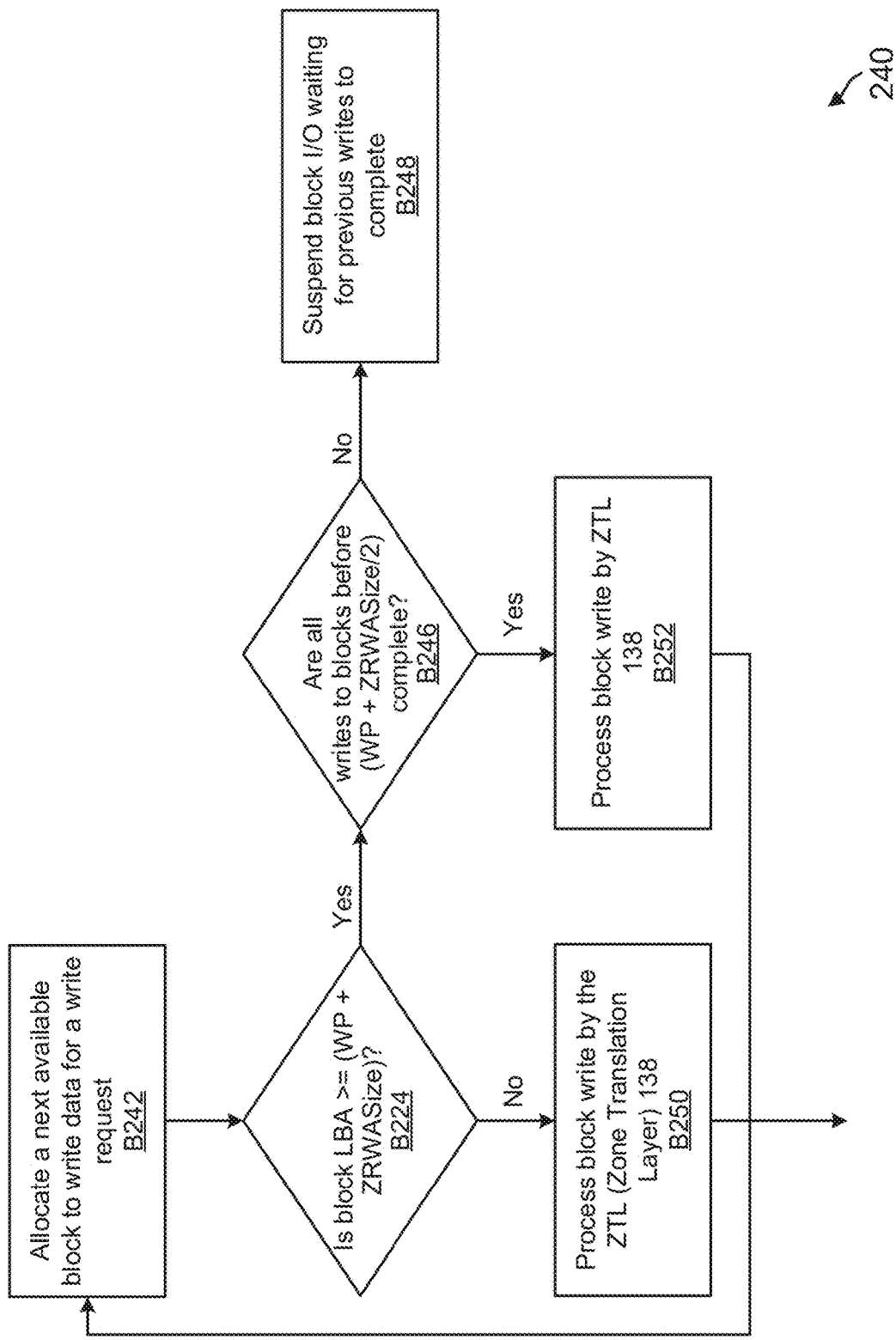
FIG. 2C shows a process for parity overwrite, according to one aspect of the present disclosure.

FIG. 2C shows a process 240 for writing to a RZone, according to one aspect of the present disclosure. Process 240 begins when a write request has been received and a next available block is allocated by the file system manager 134 for writing data for the write request. In block 244, the ZTL 138 determines if the block that needs to be rewritten belongs to a certain range identified by the WP 154 (FIG. 1F) and the RZRWA 156 size. The ZTL 138 tracks the WP 154 and is aware of a last written block. If not, then in block B250, the write I/O is sent to the ZTL 138 and handled per the process of FIG. 2A. If yes, then ZTL 138 determines if all the previous blocks for previous one or more write requests, before WP+ZRWA size/2 have been written. If not, then the write I/O is held in block B248 until the previous write requests are complete. If yes, then the write I/O is sent to the ZTL 138 and handled per the process of FIG. 2A.

Figure 2D:
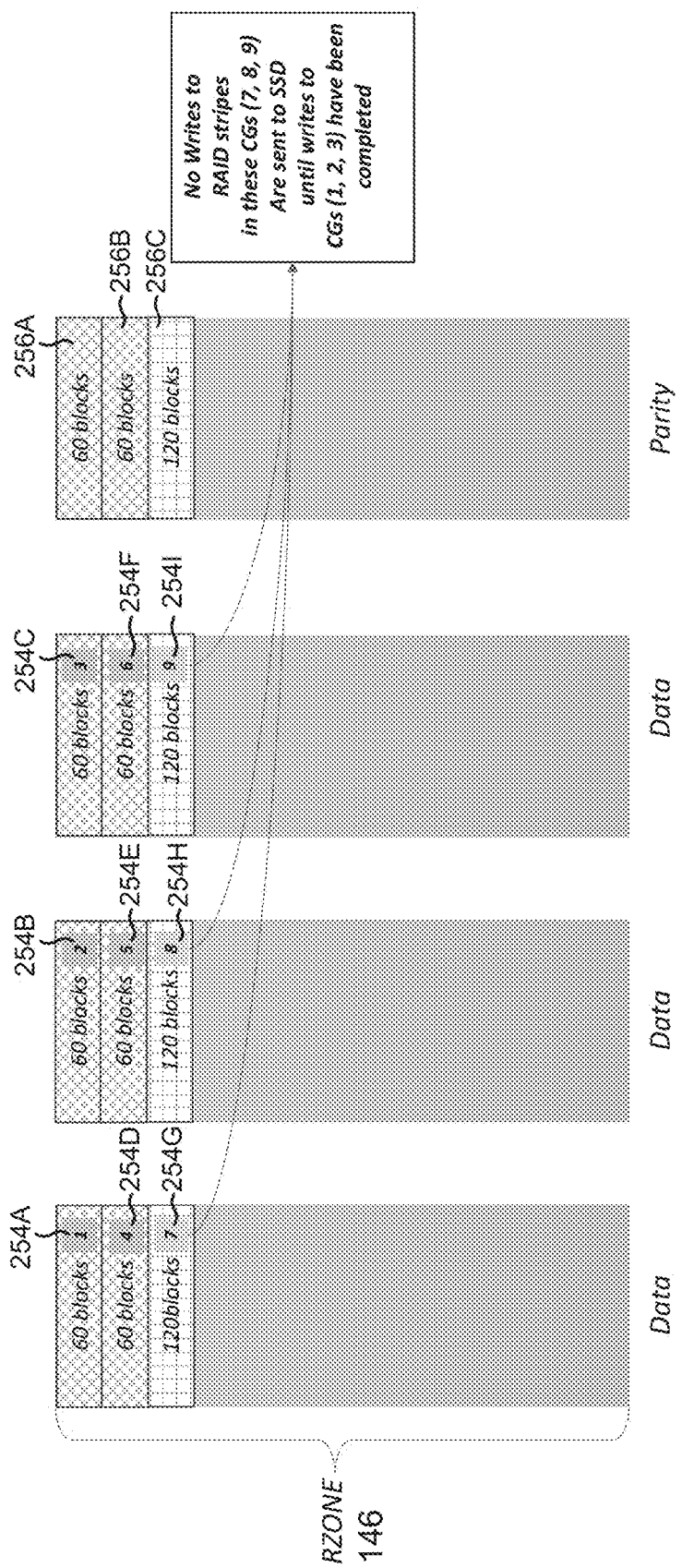
FIG. 2D illustrates a parity overwrite example, according to one aspect of the present disclosure.

An example, of process 240 is shown in FIG. 2D that illustrates the I/Os buffered in the storage server memory 232 to ensure that parity drive RZone blocks remain over-writable until a specific TIER2 RAID stripe has been written. FIG. 2D shows the ZNS SSDs 110A-110C with the parity drive 110D. No writes to RAID stripes within commit groups (CGs) 254G, 254H, and 254I with parity 256C are written to the ZNS SSDs until all the writes defined by CGs 254A-254F with parity at 256A/256B have been written. This ensures that all parity updates can be handled sequentially and reduces error risks for parity updates.

Read Operations: To read from a RZone, the ZTL 138 receives a read request and translates logical blocks address (LBAs) for the RZone that are provided by the file system manager 134 to the underlying LBAs of the PZones. The translated LBAs are then used to issue multiple parallel read I/O requests to the ZNS SSDs to obtain data for the read request. An example of the LBA translation is provided below.

For a given raided_zone lba, "rzlba," a corresponding physical zone LBA, "pzlba" can be determined as follows:

```
pzlba (Output)
xlate_rzlba_to_pzlba(rzlba (input))
    {
        rzlba_starting           = (rzlba /
    raided_zone_capacity)
    *raided_zone_capacity;
        rzlba_offset             = rzlba -
    rzlba_starting;
        stripe_offset            = rzlba_offset -
    (rzlba_offset / (st_depth * st_width)) *
        (st_width * st_depth);
        pzone_index = stripe_offset / st_depth;
        pzone_start_lba = (rzlba_starting /
    (physical_zone_cap * st_width_data)) *
    (physical_zone_size *
    st_width_data_parity);
                pzone_lba        = (rzlba_offset /
    (st_depth * st_width_data)) * st_depth;
        pzone_lba                = pzone_lba +
    pzone_index * pzone_size;
        pzone_lba                = pzone_lba +
    (stripe_offset % st_depth);
        pzone_lba   = pzone_lba +
    pzone_start_lba;
            return pzone_lba;
    }
```

The following defines the various parameters of the pseudo code above:
  raided_zone: A set of physical zones grouped together for raided data layout.
  physical_zone: A ZNS zone exposed by a ZNS SSD (e.g. 110A.)
  raided_zone_capacity: Capacity of a RZone.
  physical_zone_capacity: Capacity of a PZone.
  physical_zone_size: Size of the PZone.
  data_zone: A zone on which data is written.
  parity_zone: A zone holding parity for the data written in the data zones.
  st_width_data: Number of data zones in a stripe.
  st_width_data_parity: Number of zones in a stripe, data and parity.
  st_depth: Number of LBAs in a data zone written before moving to the next data zone.
  rzlba: Externally visible RZone LBA.
  pzlba: PZone LBA.

Figure 2E:
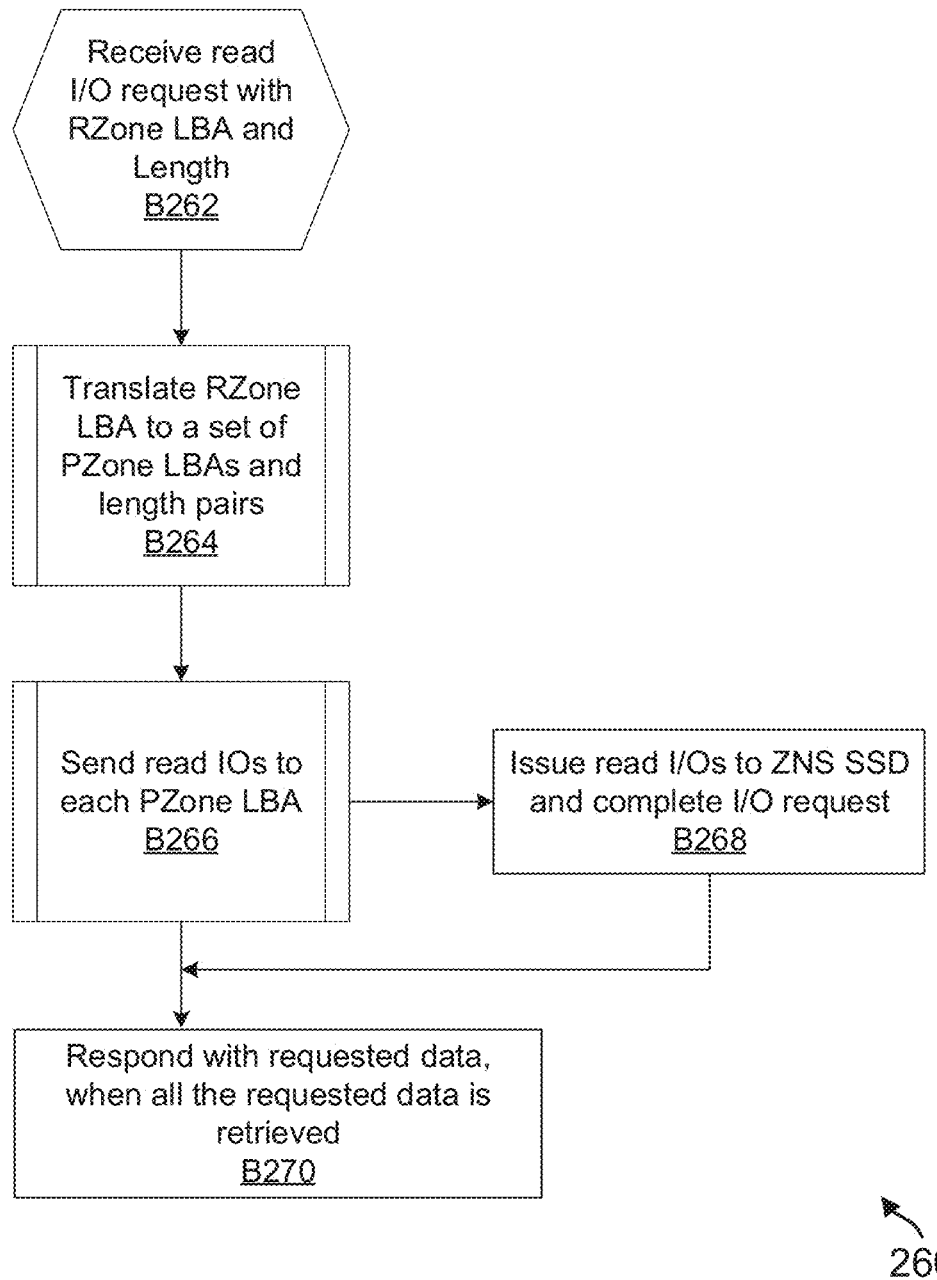
FIG. 2E shows a process for executing a read operation, according to one aspect of the present disclosure.

FIG. 2E shows a process 260 for processing a read request, according to one aspect of the present disclosure. The process begins in block B262, after a read I/O request is received by the ZTL 138 from the TIER2 RAID layer 136. The read request includes a RZone LBA (rzlba) and length. In block B264, the ZTL 138 translates the rzlba into a set of pzlba and length pairs. The translation may be executed using the pseudo code described above. The pzlba and the length pairs are provided to the TIER1RAID layer 140 as read I/Os for each PZone LBA in block B266. In block B268, the TIER1 RAID layer 140 issues read I/O requests to the ZNS SSD that stores the requested data. Once all the requested data has been retrieved, a reply to the read request with the requested data is sent in block B270.

Reconstructing Data: FIG. 2F shows a process 276 for reconstructing data when an error is encountered during the read process of FIG. 2E. During a read operation, if there is an error associated with a block and a ZNS SSD indicates a media error, the TIER1 RAID layer 140 reconstructs the data by reading blocks of a stripe associated with the read operation and XORs the blocks with the parity stored at the parity zone, as described above. This prevents propagation of a media error seen from the ZNS SSD to upper layer software because the TIER1 RAID layer 140 can reconstruct the data. The same reconstruction mechanism is used when an independent MU of a ZNS SSD fails and the zones associated with the MU become unavailable. In this instance, the TIER1 RAID layer 140 reconstructs the data for the blocks mapped to those zones during the read operation.

Process 276 begins when a read operation is in progress, as shown in block B278. In block B280, TIER1 RAID layer 140 determines if all blocks associated with a read request are successfully read, if yes, then the data is returned in block B282. If the blocks are not successfully read, then in block B284, the TIER1 RAID layer 140 reads each block associated with the read request to identify the block that failed. In block B286, for each failed block, other blocks, including the parity block, in the stripe associated with the read request are read. If all the blocks are read, as determined in block B288, the failed block is reconstructed by XORing the successfully read data and the parity blocks in block B290. The reconstructed data is then returned in block B292. If the blocks are not read in block B288, then the read operation fails in block B294 and a failure indication is sent to the file system manager 134.

Figure 3:
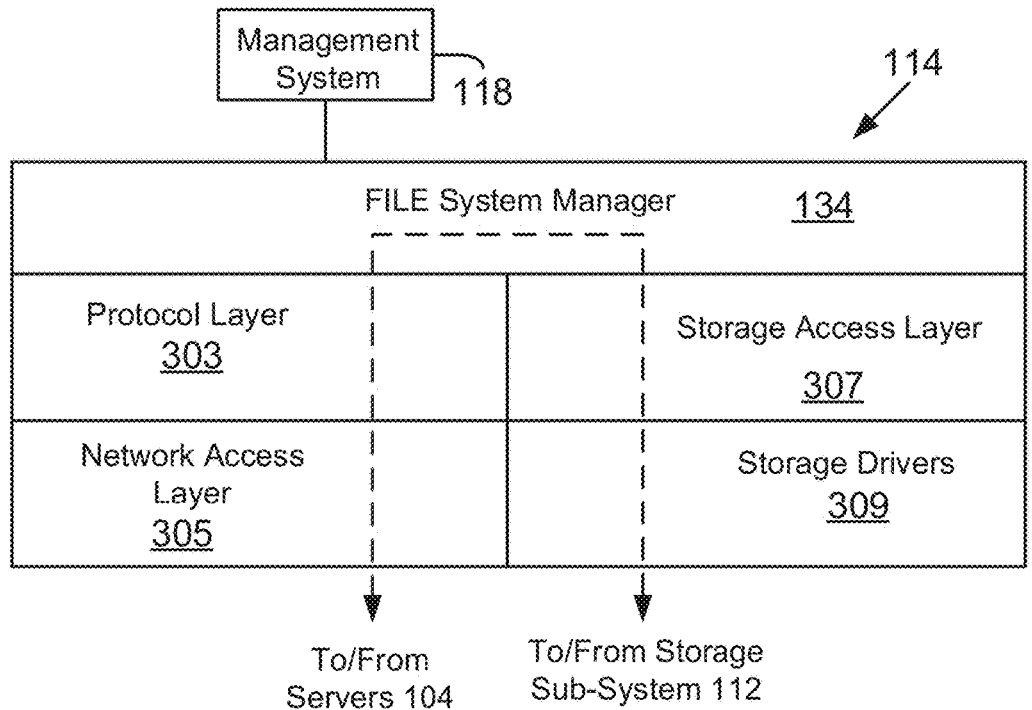
FIG. 3 shows an example of a storage operating system, used according to one aspect of the present disclosure.

Storage Operating System: FIG. 3 illustrates a generic example of operating system 114 executed by storage server 108, according to one aspect of the present disclosure. Storage operating system 114 interfaces with the storage sub-system 112 as described above in detail.

As an example, operating system 114 may include several modules, or "layers". These layers include a file system manager 134 that keeps track of a directory structure (hierarchy) of the data stored in storage devices and manages read/write operations, i.e., executes read/write operations on disks in response to server system 104 requests.

Operating system 114 may also include a protocol layer 303 and an associated network access layer 305, to allow storage server 108 to communicate over a network with other systems, such as server system 104, and management console 118. Protocol layer 303 may implement one or more of various higher-level network protocols, such as NFS, CIFS, Hypertext Transfer Protocol (HTTP), TCP/IP and others.

Network access layer 305 may include one or more drivers, which implement one or more lower-level protocols to communicate over the network, such as Ethernet. Interactions between server systems 104 and the storage sub-system 112 are illustrated schematically as a path, which illustrates the flow of data through operating system 114.

The operating system 114 may also include a storage access layer 307 and an associated storage driver layer 309 to communicate with a storage device. The storage access layer 307 may implement a higher-level disk storage protocol, such as TIER2 RAID layer 136, ZTL 138 and TIER1 RAID layer 140, while the storage driver layer 309 may implement a lower-level storage device access protocol, such as the NVMe protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage server 108.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
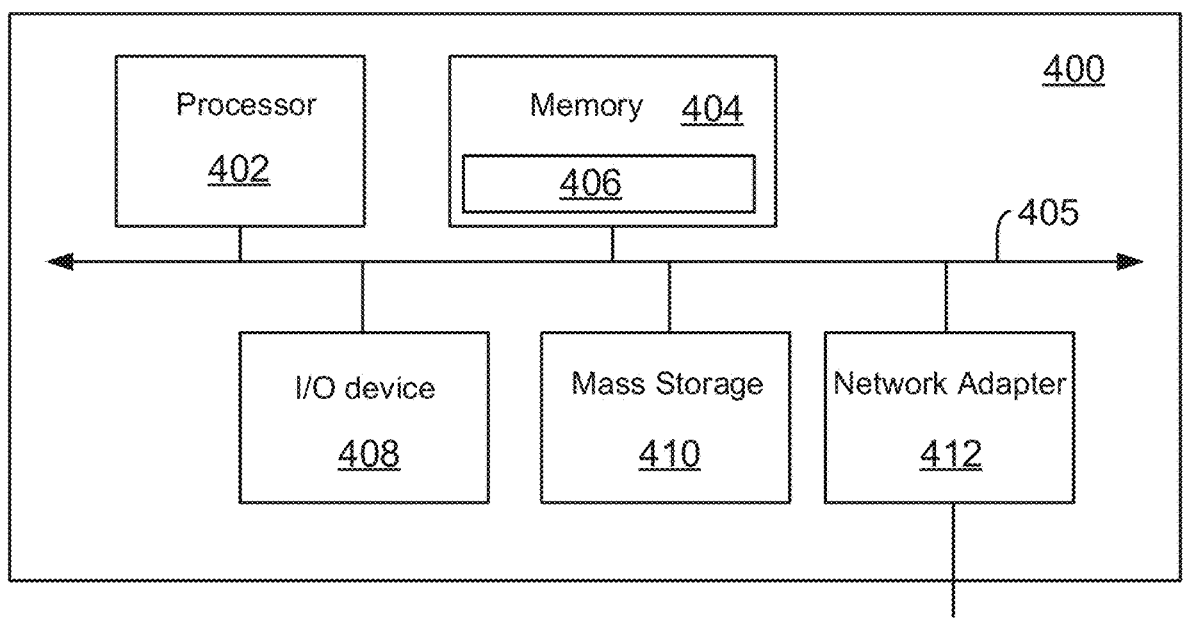
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent the storage server 108, the management console 118, server systems 104, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process blocks of FIGS. 1G, 2A, 2C and 2E-2F.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and especially useful in the cloud computing environment where storage at ZNS 110 is presented and shared across different platforms. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure, followed by a "server" layer that includes hardware and computer software designed for cloud specific services. The storage systems described above may be a part of the server layer for providing storage services. Details regarding these layers are not germane to the inventive aspects.

Thus, a method and apparatus for protecting data using ZNS SSDs within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising;
presenting a plurality of physical zones (PZones) to a first tier RAID (redundant array of independent disks) layer, and a plurality of RAID zones (RZones) to a second tier RAID layer, the PZones based on storage space of a plurality of zoned solid-state drives (ZNS SSDs) of a storage subsystem and each RZone having a plurality of PZones;
in response to a write request received by the first tier RAID layer from the second tier RAID layer to write data, determining, by the first tier RAID layer that the data when written will be within an implicit commit region of a RZone indicated by the write request, the implicit commit region used by the first tier RAID layer to commit data from a RZone buffer to one or more PZones; and
storing, by the first tier RAID layer, the data associated with the write request at one or more PZones and parity data corresponding to the data at a parity PZone of each ZNS SSD and at a single parity ZNS SSD.

2. The method of claim 1, wherein storing, by the first tier RAID layer, the data associated with the write request at one or more PZones and parity data, further comprising:
transferring, by the first tier RAID layer, data associated with the write request from a memory to a zone random write area (ZRWA) corresponding to a PZone.

3. The method of claim 2, further comprising:
committing, by the first tier RAID layer, the data from the ZRWA to the corresponding PZone, in response to the ZRWA reaching a threshold value.

4. The method of claim 2, further comprising:
transferring, by the first tier RAID layer, the parity data to a parity ZRWA corresponding to the parity PZone.

5. The method of claim 4, further comprising:
committing, by the first tier RAID layer, the parity data to the parity PZone, after data for the write request has been stored at the one or more PZones.

6. The method of claim 2, further comprising:
utilizing, by the first tier RAID layer, a first pointer to track data movement from a RZone ZRWA to the RZone.

7. The method of claim 2, further comprising:
utilizing, by the first tier RAID layer, a second pointer to track data movement between the ZRWA and the corresponding PZone.

8. A non-transitory, machine-readable storage medium having stored thereon instructions for performing a method, comprising machine executable code which when executed by at least one machine, causes the machine to:
receive a write request by a first tier RAID (redundant array of independent disks) layer from a second tier RAID layer to write data at a plurality of zoned solid-state drives (ZNS SSDs) of a storage subsystem, wherein storage space at the plurality of ZNS SSDs is configured into physical zones (PZones) presented to the first tier RAID layer that presents RAID zones (RZones) to the second tier RAID layer, each RZone having a plurality of PZones;
delay, by the first tier RAID layer, processing the write request, in response to determining that the data, when written, will be outside a commit region of a zone random write area (ZRWA) corresponding to the RZone specified by the write request, and data for other pending write requests has not been committed to one or more PZones; and
in response to committing the data for the other write requests, store, by the first tier RAID, parity data for the write request data in a single parity ZNS SSD; and within a parity PZone of each ZNS SSD.

9. The non-transitory, machine-readable storage medium of claim 8, wherein the machine executable code which when executed by at least one machine, further causes the machine to:
determine, by the first tier RAID, the parity data.

10. The non-transitory, machine-readable storage medium of claim 8, wherein the machine executable code which when executed by at least one machine, further causes the machine to:
utilize, by the first tier RAID layer, a first write pointer for each PZone to track data written at each PZone.

11. The non-transitory, machine-readable storage medium of claim 8, wherein the machine executable code which when executed by at least one machine, further causes the machine to:
utilize, by the first tier RAID layer, a second write pointer for each RZone to track data written for each RZone.

12. The non-transitory, machine-readable storage medium of claim 8, wherein the machine executable code which when executed by at least one machine, further causes the machine to:
transfer data for the write request from a memory to a ZRWA corresponding to a PZone; and
commit the data for the write request from the ZRWA to the corresponding PZone, when the ZRWA reaches a threshold.

13. The non-transitory, machine-readable storage medium of claim 12, wherein the machine executable code which when executed by at least one machine, further causes the machine to:
transfer the parity data to a parity ZRWA; and
commit the parity data to a parity PZone corresponding to the parity ZRWA, after data for the write request has been stored at one or more PZones.

14. A system, comprising:
a memory containing machine readable medium comprising machine executable code having stored thereon instructions; and
a processor module of an offload engine coupled to the memory, the processor module configured to execute the machine executable code to:
receive a write request by a first tier RAID (redundant array of independent disks) layer from a second tier RAID layer to write data at a plurality of zoned solid-state drives (ZNS SSDs) of a storage subsystem, wherein storage space at the plurality of ZNS SSDs is configured into physical zones (PZones) presented to the first tier RAID layer that presents RAID zones (RZones) to the second tier RAID layer, each RZone having a plurality of PZones;
delay, by the first tier RAID layer, processing the write request, in response to determining that the data, when written, will be outside a commit region of a zone random write area (ZRWA) corresponding to the RZone specified by the write request, and data for other pending write requests has not been committed to one or more PZones; and
in response to committing the data for the other write requests, store, by the first tier RAID, parity data for the write request data in a single parity ZNS SSD; and within a parity PZone of each ZNS SSD.

15. The system of claim 14, wherein the machine executable code further causes to:
utilize, by the first tier RAID layer, a first write pointer for each PZone to track data written at each PZone.

16. The system of claim 14, wherein the machine executable code further causes to:
utilize, by the first tier RAID layer, a second write pointer for each RZone to track data written for each RZone.

17. The system of claim 14, wherein the machine executable code further causes to:
transfer data for the write request from a memory to a ZRWA corresponding to a PZone.

18. The system of claim 17, wherein the machine executable code further causes to:
commit the data for the write request from the ZRWA to the corresponding PZone, when the ZRWA reaches a threshold.

19. The system of claim 14, wherein the machine executable code further causes to:
transfer the parity data to a parity ZRWA.

20. The system of claim 19, wherein the machine executable code further causes to:
commit the parity data to a parity PZone corresponding to the parity ZRWA, after data for the write request has been stored at one or more PZones.

* * * * *